United States Patent
Boehme et al.

(10) Patent No.: US 7,051,547 B2
(45) Date of Patent: May 30, 2006

(54) AIR CONDITIONING SYSTEM FOR A MOTOR VEHICLE

(75) Inventors: Dietmar Boehme, Duisburg (DE); Dietmar Fischer, Cologne (DE); Uwe Heinz, Hueckelhoven (DE)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 10/437,835

(22) Filed: May 14, 2003

(65) Prior Publication Data

US 2004/0016258 A1  Jan. 29, 2004

(30) Foreign Application Priority Data

May 14, 2002  (EP) .................................. 02100491

(51) Int. Cl.
*F25B 45/00* (2006.01)

(52) U.S. Cl. ................. 62/292; 62/77; 62/149

(58) Field of Classification Search .................... 62/77, 62/149, 292, 132; 137/205
See application file for complete search history.

(56) References Cited

U.S. PATENT DOCUMENTS

| 4,827,093 | A | * | 5/1989 | Strzodka .................. 200/82 C |
| 5,005,375 | A | | 4/1991 | Manz et al. |
| 5,293,902 | A | | 3/1994 | Lapierie |
| 5,295,360 | A | * | 3/1994 | Olds et al. ..................... 62/127 |
| 5,988,245 | A | * | 11/1999 | Rosenberg ................... 152/427 |
| 6,382,929 | B1 | * | 5/2002 | Di Benedetto .............. 417/307 |

OTHER PUBLICATIONS

Vieweg Handbuch Kraftfahrzeugtechnik, Braess/Seiffert, Vieweg & Sohn Verlagsgesellschaft mbH, Braunschweig/Wiesbaden, Germany, 2nd edition, Apr. 2001.

* cited by examiner

*Primary Examiner*—Melvin Jones
(74) *Attorney, Agent, or Firm*—Raymond L. Coppiellie; Brooks & Kushman P.C.

(57) ABSTRACT

The invention relates to an air conditioning system for motor vehicles, which contains a connection piece for a pressure switch/pressure sensor, said connection piece being suitable for evacuating and filling the air conditioning system after the removal of the pressure switch/pressure sensor, so that the two normally separate functions are combined in one connection piece.

17 Claims, 2 Drawing Sheets

AIR CONDITIONING SYSTEM FOR A MOTOR VEHICLE

BACKGROUND OF THE INVENTION

1. Field of the Invention

The invention relates to an air conditioning system for motor vehicles, which contains a connection piece for a pressure switch/pressure sensor, said connection piece being suitable, after the removal of the pressure switch/pressure sensor, for evacuating and filling the air conditioning system, so that the two usually separate functions are combined in one connection piece. The invention relates, furthermore, to an adapter which makes it possible to connect an evacuating and filling unit to a currently customary connection piece for a pressure switch/pressure sensor. The currently customary additional arrangement of connection pieces for evacuating and filling the air conditioning system thereby becomes superfluous.

2. Background Art

Motor vehicles are normally driven by means of internal combustion engines. These internal combustion engines, in turn, are maintained at a specific temperature level by means of a cooling circuit. To heat the interior of a motor vehicle, the circulating coolant of this cooling circuit is used, as a rule, said coolant discharging the heat contained in it to the interior via a heat exchanger and a blower.

Air conditioning systems are increasingly used for cooling the interior of a motor vehicle. The state of the art is, as described in viewing Handbuch Kraftfahrzeugtechnik [Manual of Motor Vehicle Technology], $2^{nd}$ Edition, April 2001, p. 5 ff., in this case to cause a refrigerant compressor to be driven mechanically by the internal combustion engine of a motor vehicle. The refrigerant is conveyed from the compressor through a condenser, which discharges the heat from the refrigerant, and an adder to the expansion valve. Here, the refrigerant compressed in the compressor expands and subsequently evaporates in the evaporator and thus extracts heat from the ambient air in a known way. As a rule, the evaporator is integrated into the heating housing, so that the blower and the air distribution can be utilized for the heating of the motor vehicle. The refrigerant is led from the evaporator back to the compressor, and the refrigerant circuit is thus closed.

Alternatively to the expansion valve, a small capillary tube is often used as a throttling member. This is substantially more cost-effective than an expansion valve, but said adder then has to be replaced by an approximately twice as large accumulator in the line from the evaporator back to the compressor.

The regulation of air conditioning systems having small capillary tubes is usually carried out via a suitable pressure-sensitive component, such as a pressure switch or pressure sensor, which is likewise arranged in the line between the evaporator and compressor. In this case, use is made of the fact that, in the case of the customary refrigerant 134a, there is a direct relation between pressure and temperature, so that the temperature can be concluded from the measured pressure. This pressure switch or pressure sensor is usually fastened to an air conditioning system line via a fastening thread by means of a correspondingly designed connection piece, the connection piece containing a spring-loaded one-way valve which is very similar in its construction to customary motor vehicle wheel valves. The connection piece itself is, as a rule, welded or soldered to an air conditioning system line.

Irrespective of the type of regulation of the air conditioning system, normally a further connection piece for connecting a pressure switch or pressure sensor to the high-pressure line between the compressor and the regulating unit is attached, both in systems with an expansion valve and with systems with a small capillary tube. This pressure switch or pressure sensor serves, in general, as a high-pressure safety element for switching off the compressor when pressures are too high and is employed for controlling a radiator fan.

To fill with refrigerant, service and/or filling connection pieces are attached to the refrigerant lines. These connection pieces, too, contain spring-loaded valves. Via these connection pieces, by means of standardized quick-action couplings, the evacuation and first filling of the air conditioning system are carried out or service work is dealt with during the lifetime of the motor vehicle. These connection pieces, too, are normally welded or soldered to the air conditioning system lines.

The conventional filling quantity for an air conditioning system of a motor vehicle is at the present time, according to Vieweg, approximately 600 to 900 g of R 134a. Reliable operation of the air conditioning system is ensured as long as approximately 70% of the original filling quantity is still located in the refrigerant circuit. One disadvantage of present-day air conditioning systems is that small quantities of refrigerant may escape through the hoses and sealing rings of the air conditioning system. It is therefore advantageous to keep the number of sealing points as low as possible.

Since each connection piece requires an additional soldering operation, a reduction in the number of connection pieces consequently means a marked reduction in the number of soldering operations, and, moreover, there is a slightly lower consumption of material. Furthermore, in this way, two valves can be dispensed with.

SUMMARY OF THE INVENTION

Against this background, the object of the present invention was to develop an air conditioning system which has a reduced number of connection pieces, in order thereby to reduce the number of sealing points and, at the same time, reduce the outlay in terms of material and production.

This object is achieved by an air conditioning system for motor vehicles which has the features of claim 1. Further advantageous embodiments are contained in the subclaims.

According to the invention, one or more connection pieces of an air conditioning system for motor vehicles are used for the mounting of pressure switches or pressure sensors.

In this case, depending on the design of the air conditioning system, a low-pressure switch or low-pressure sensor and/or a high-pressure switch/high pressure sensor are used. Each connection piece is in this case shaped in such a way that, after removal of the pressure switch/pressure sensor, it is possible to connect a quick-action coupling of an evacuating and filling unit. As a result, the currently customary additional arrangement of connection pieces for evacuating and filling the air conditioning system becomes superfluous, and therefore the number of sealing points is reduced. This results, at the same time, in cost savings arising from the reduced use of material and from less complex production. It is, however, necessary to modify the pressure switches/pressure sensors produced at the present time in large series.

In an advantageous embodiment of the invention, the abovementioned connection piece or connection pieces contain a valve. This valve opens during the mounting of a pressure switch/pressure sensor or due to the connection of the quick-connection coupling of an evacuating and filling unit and automatically closes during the demounting of a pressure switch/pressure sensor or when the quick-action coupling of an evacuating or filling unit is removed. The advantage of this is that no refrigerant can in an uncontrolled way leave the air conditioning system circuit and passing into the environment during the mounting or demounting of pressure switches/pressure sensors and during the connection or removal of quick-action couplings of an evacuating and filling unit.

In a further embodiment of the invention, after the removal of a pressure switch/pressure sensor of the air conditioning system, first an adapter is mounted on the thus released connection piece of the air conditioning system, so that the evacuating and filling device can then be connected. This embodiment has the advantage that the present-day pressure switches/pressure sensors or quick-action couplings manufactured in large series can continue to be used, unchanged. The currently customary additional arrangement of connection pieces for evacuating or filling the air conditioning system thereby becomes superfluous.

In an advantageous development of the invention, the adapter is designed in such a way that the valve in the connection piece is opened when the evacuating and filling system is connected. Handling is thereby appreciably simplified.

In an advantageous development of the invention, a one-way valve is integrated into the adapter. In this variant, the one-way valve in the connection piece is opened when the adapter is attached, so that, as in the known operation of an evacuating and filling device, the evacuating and filling device can be connected directly to the air conditioning system circuit.

In an advantageous development of the invention, both the valve in the connection piece and the valve in the adapter are opened, when the evacuating and filling system is connected. Handling is thereby appreciably simplified.

An advantageous development of the invention is distinguished in that the adapter contains at least two valves. This variant affords a particularly high degree of safety against the loss of refrigerant.

In an advantageous embodiment of the variant having at least two valves, one valve opens as soon as the adapter is attached to the connection piece, while a second valve is opened when the evacuating and filling appliance is connected. User friendliness is thus markedly increased.

In a further advantageous embodiment of the invention, the adapter according to the invention is integrated into an evacuating and filling unit. This has the advantage that the adapter according to the invention is located at all times on the evacuating and filling system and cannot possibly be mislaid in a workshop or during production.

In further advantageous embodiments of the invention, the adapter has at least one further connection or branch which is suitable, for example, for connecting a pressure measuring appliance. By means of at least one branch, more than merely the straightforward connection function for the evacuating and filling system can be integrated in the adapter.

In one development of the invention, the at least one pressure switch/pressure sensor is shaped in such a way that it has a connection in the manner of a quick-action coupling of the evacuating and filling device. Thus, the customary shape of the filling and/or service connection pieces can be maintained, while the currently customary additional arrangement of connection pieces for the pressure switch/pressure sensor of the air conditioning system becomes superfluous.

BRIEF DESCRIPTION OF THE DRAWINGS

The invention is explained in more detail with reference to the exemplary embodiments shown in the accompanying drawings in which.

DETAILED DESCRIPTION OF THE PREFERRED EMBODIMENTS

Figure 1:
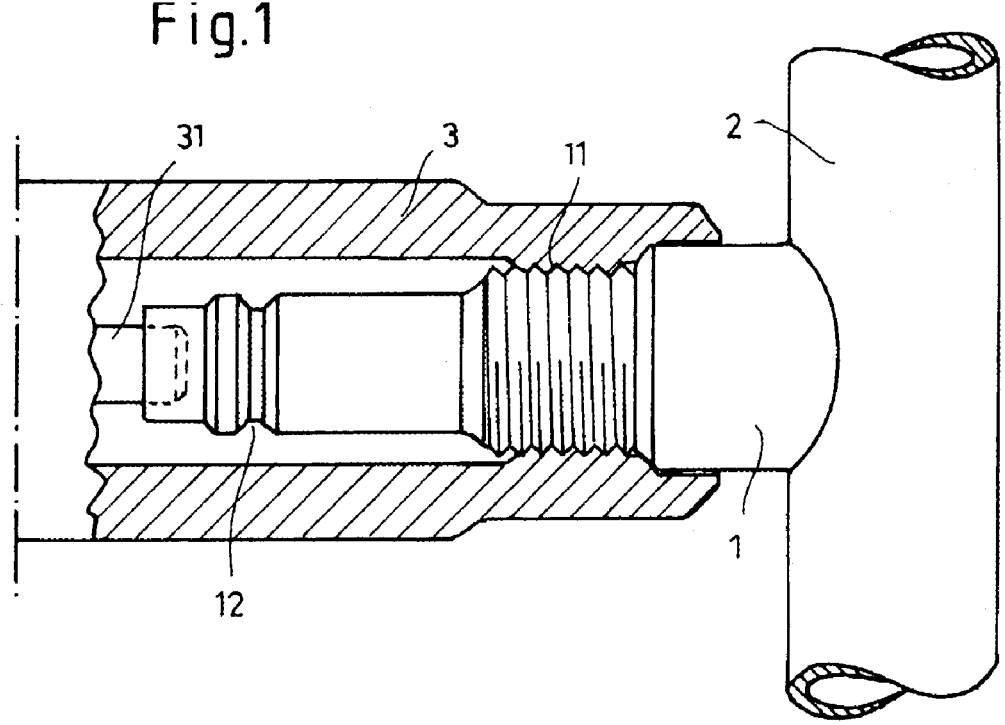
FIG. 1 shows a diagrammatic drawing of a preferred version of a connection piece of the air conditioning system according to the invention.

FIG. 1 shows a diagrammatic drawing of part of the air conditioning system according to the invention. In this case, in the figure, a connection piece 1 is connected to a line 2 of the air conditioning system in a materially integral manner. A pressure switch 3 is screwed via the thread 11 to the connection piece 1. A projecting part 31 of the pressure switch 3 in this case holds the one-way valve (not shown here) open, so that a direct pressure measurement of the refrigerant pressure in the line 2 of the air conditioning system is possible. If, then, the pressure switch 3 is removed, the integrated one-way valve closes. That part of the connection piece 1 which faces away from the air conditioning system line 2 is then free and makes it possible to mount a quick-action coupling of an evacuating and filling unit, the quick-action coupling being capable of engaging in the groove 12.

Figure 2:
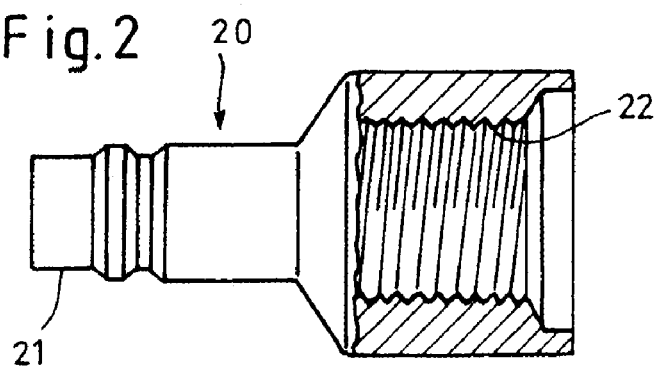
FIG. 2 shows a drawing of the adapter according to the invention.

FIG. 2 illustrates a possible version of the adapter 20 according to the invention. In this case, the end 21 of the adapter is shaped in such a way that it is suitable for mounting a quick-action coupling of an evacuating and filling unit. By contrast, the other end 22 of the adapter has a thread which corresponds to the thread of a currently customary pressure switch/pressure sensor, so that mounting on a connection piece of an air conditioning system for pressure switches/pressure sensors is possible.

Figure 3:
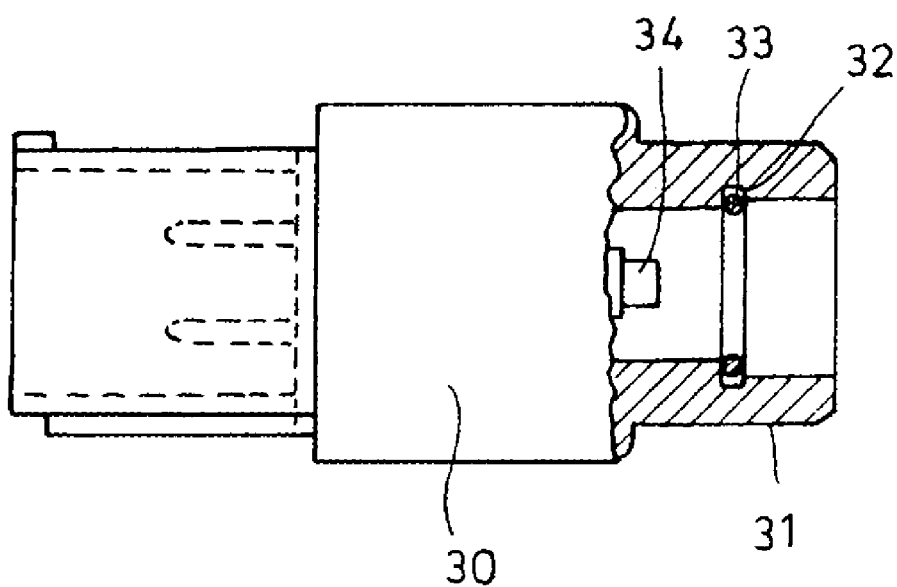
FIG. 3 shows a drawing of a pressure switch/pressure sensor according to the invention.

FIG. 3 shows, finally, a pressure switch/pressure sensor 30 according to the invention. The end 31 is in this case shaped in such a way that it can be mounted onto a connection piece in the same way as a quick-action coupling of an evacuating and filling unit. The groove 32 in this case contains a spring ring 33 which ensures interlocking in a known way in the case of a quick-action coupling. The cylindrical extension 34 shown serves, during mounting, for opening the one-way valve usually contained in a connection piece.

The invention claimed is:

1. An air conditioning system for a motor vehicle comprising:
   a connection piece having a valve, the connection piece being adapted to engage either a pressure switch or an evacuating and filling device; and
   an adapter integrated in the evacuating and filling device and configured to open the valve when the evacuating and filling device is engaged;

wherein the adapter is attached to the connection piece before connecting the evacuating and filling device to the connection piece.

2. The air conditioning system for motor vehicles as claimed in claim 1, wherein the adapter contains a valve.

3. The air conditioning system for motor vehicles as claimed in claim 2, wherein the adapter is shaped in such a way that both the valve in the adapter and the valve in the connection piece are opened when the evacuating and filling device is connected.

4. The air conditioning system for motor vehicles as claimed in claim 1, wherein the adapter contains at least two valves.

5. The air conditioning system for motor vehicles as claimed in claim 4, wherein the adapter is shaped in such a way that at least one of the at least two valves in the adapter is opened when the evacuating and filling device is connected.

6. The air conditioning system for motor vehicles as claimed in claim 1, wherein the adapter has at least one further connection or branch.

7. The air conditioning system for motor vehicles as claimed in claim 1, further comprising a quick action coupling wherein the pressure switch includes a first portion of the quick-action coupling that corresponds to a second portion of the quick-action coupling disposed on the evacuating and filling device.

8. An air conditioning system for a motor vehicle comprising:
a connection piece having a valve, the connection piece being adapted to engage either a pressure switch having a first portion of the quick-action coupling or an evacuating and filling device having a second portion of the quick-action coupling; and
an adapter configured to open the valve when the evacuating and filling device is engaged;
wherein the adapter is attached to the connection piece before connecting the evacuating and filling device to the connection piece.

9. The air conditioning system for motor vehicles as claimed in claim 8, wherein the adapter contains a valve.

10. The air conditioning system for motor vehicles as claimed in claim 9, wherein the adapter is shaped in such a way that both the valve in the adapter and the valve in the connection piece are opened when the evacuating and filling device is connected.

11. The air conditioning system for motor vehicles as claimed in claim 8, wherein the adapter is integrated in the evacuating and filling device.

12. The air conditioning system for motor vehicles as claimed in claim 8, wherein the adapter has at least one further connection or branch.

13. An air conditioning system for a motor vehicle comprising:
a connection piece having a valve, the connection piece being adapted to engage either a pressure switch or an evacuating and filling device; and
an adapter configured to open the valve when the evacuating and filling device is engaged;
wherein the adapter is attached to the connection piece before connecting the evacuating and filling device to the connection piece and has at least one further connection or branch.

14. The air conditioning system for motor vehicles as claimed in claim 13, wherein the adapter contains a valve.

15. The air conditioning system for motor vehicles as claimed in claim 14, wherein the adapter is shaped in such a way that both the valve in the adapter and the valve in the connection piece are opened when the evacuating and filling device is connected.

16. The air conditioning system for motor vehicles as claimed in claim 13, wherein the adapter is integrated in the evacuating and filling device.

17. The air conditioning system for motor vehicles as claimed in claim 13 further comprising a quick action coupling wherein the pressure switch includes a first portion of the quick-action coupling that corresponds to a second portion of the quick-action coupling disposed on the evacuating and filling device.

* * * * *